United States Patent
Kwak

(10) Patent No.: US 8,420,982 B2
(45) Date of Patent: Apr. 16, 2013

(54) OVEN HAVING LOESS LAYERS

(76) Inventor: Hee Sun Kwak, Seoul (KR)

(*) Notice: Subject to any disclaimer, the term of this patent is extended or adjusted under 35 U.S.C. 154(b) by 359 days.

(21) Appl. No.: 12/830,672

(22) Filed: Jul. 6, 2010

(65) Prior Publication Data

US 2011/0006053 A1 Jan. 13, 2011

(30) Foreign Application Priority Data

Jul. 7, 2009 (KR) .................. 10-2009-0061685

(51) Int. Cl.
*A21B 1/00* (2006.01)

(52) U.S. Cl.
USPC .................. 219/391; 219/395; 219/408

(58) Field of Classification Search .......... 219/391, 219/392, 395, 402, 406, 407, 408, 409, 410
See application file for complete search history.

(56) References Cited

U.S. PATENT DOCUMENTS 4,706,832 A * 11/1987 Citino ....................... 99/447
5,272,317 A * 12/1993 Ryu ........................ 219/403
2005/0258161 A1 * 11/2005 Nooh ....................... 219/392

FOREIGN PATENT DOCUMENTS

WO WO 02/096243 A1 * 12/2002

OTHER PUBLICATIONS

J. B. Kim, "Oven Manufacturing Method", English abstract for Korean Published Application No. KR 2009/047410 A, published on May 12, 2009, provided by Derwent Information Ltd.*

* cited by examiner

*Primary Examiner* — Stephen W Smoot
(74) *Attorney, Agent, or Firm* — Kile Park Reed & Houtteman PLLC

(57) ABSTRACT

Provided is an oven including loess layers. The oven includes: a main body portion having a cooking space therein; loess layers that are coated on inner walls of the main body portion and that comprise red clay and yellow mica, respectively; and heat generation rods that are disposed on at least one side of the cooking space so as to heat the cooking space.

12 Claims, 14 Drawing Sheets

OVEN HAVING LOESS LAYERS

BACKGROUND OF THE INVENTION

1. Field of the Invention

The present invention relates to an oven having a loess layer, and more particularly to an oven having an inner wall coated with a loess layer that improves a taste and quality of food.

2. Description of the Related Art

Various cooking units are used to cook foodstuffs of fishes, fowls, flesh and meat, bread, etc. Ovens are widely used as cooking units. The ovens are classified into electric ovens and gas ovens according to a heating method.

Conduction, convection, and radiation are used as the heating methods of ovens. A combination of any or all of the heating methods of the conduction, convection, and radiation is under study as cooking methods of foodstuffs.

Meanwhile, in the case that foodstuffs are heated in a cooking space of an oven, taste and nutritive elements of food may vary according to water content of foodstuffs. Accordingly, methods of controlling moisture content of foodstuffs are under study.

According as pathogenic bacteria such as avian influenza (AI) appear, it becomes more important to control a heating temperature when special foodstuffs such as fowls are cooked.

In addition, a demand of enhancing taste and nutrition of food increases according to a consumer's standard of living.

However, when foodstuffs are heated in an oven, a problem that foodstuffs are not evenly heated may happen. Further, cooks and cooking assistants may be exposed to a danger of infection to avian influenza (AI) in the case of foodstuffs such as fowls.

In addition, in the case that food does not contain proper water after having cooked, a taste of food may fall.

SUMMARY OF THE INVENTION

To overcome problems or inconveniences of the conventional art, it is an object of the present invention to provide an oven having a loess layer that improves a taste and quality of food.

Other objects of the present invention are not limited to the above-mentioned object, but it will be obvious to those who are skilled in the art that the other objects will be clearly understood from the following description.

To accomplish the above object of the present invention, according to an aspect of the present invention, there is provided an oven comprising:

a main body portion having a cooking space therein;

loess layers that are coated on inner walls of the main body portion and that comprise red clay and yellow mica, respectively; and heat generation rods that are disposed on at least one side of the cooking space so as to heat the cooking space.

According to another aspect of the present invention, there is provided an oven comprising:

a main body portion having a cooking space therein;

a door portion through which foodstuffs are taken in or out from the cooking space;

heat generation layers with which inner walls of both the main body portion and the door portion are covered and that comprise a carbon fiber, respectively; and loess layers that are coated on the heat generation layers and that comprise red clay and yellow mica, respectively.

According to still another aspect of the present invention, there is provided an oven comprising:

a main body portion having a cooking space therein;

a complex loess heat generation layer that comprises: a first loess heat generation layer; a second loess heat generation layer that is disposed spaced from the first loess heat generation layer; and an air layer that is interposed between the first loess heat generation layer and the second loess heat generation layer; and supports that support the first loess heat generation layer and the second loess heat generation layer so that the first loess heat generation layer and the second loess heat generation layer are spaced from each other, wherein the first loess heat generation layer comprises a first heat generation layer and a first loess layer that is coated on the first heat generation layer, wherein the second loess heat generation layer comprises a second heat generation layer and a second loess layer that is coated on the second heat generation layer, and wherein the complex loess heat generation layer covers at least a part of the cooking space.

Other specific features of this invention will be given in the following detailed description with reference to the accompanying drawings.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

The nature, advantages and various additional features of the invention will appear more fully upon consideration of the illustrative embodiments now to be described in detail with the accompanying drawings.

However, the present invention is not limited to the following embodiments but will be embodied in various forms. That is, the embodiments of the present invention play a role of making the disclosure of the present invention perfect, and are provided to inform a person who has an ordinary knowledge and skill in a technological field to which this invention belongs of a category of the invention. This invention should be defined based on the scope of claims.

Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a," "an" and "the" are intended to include the plural forms as well, unless the context clearly indicates otherwise. It will be further understood that the terms "comprises", "comprising", "includes", "including" and/or "made of", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
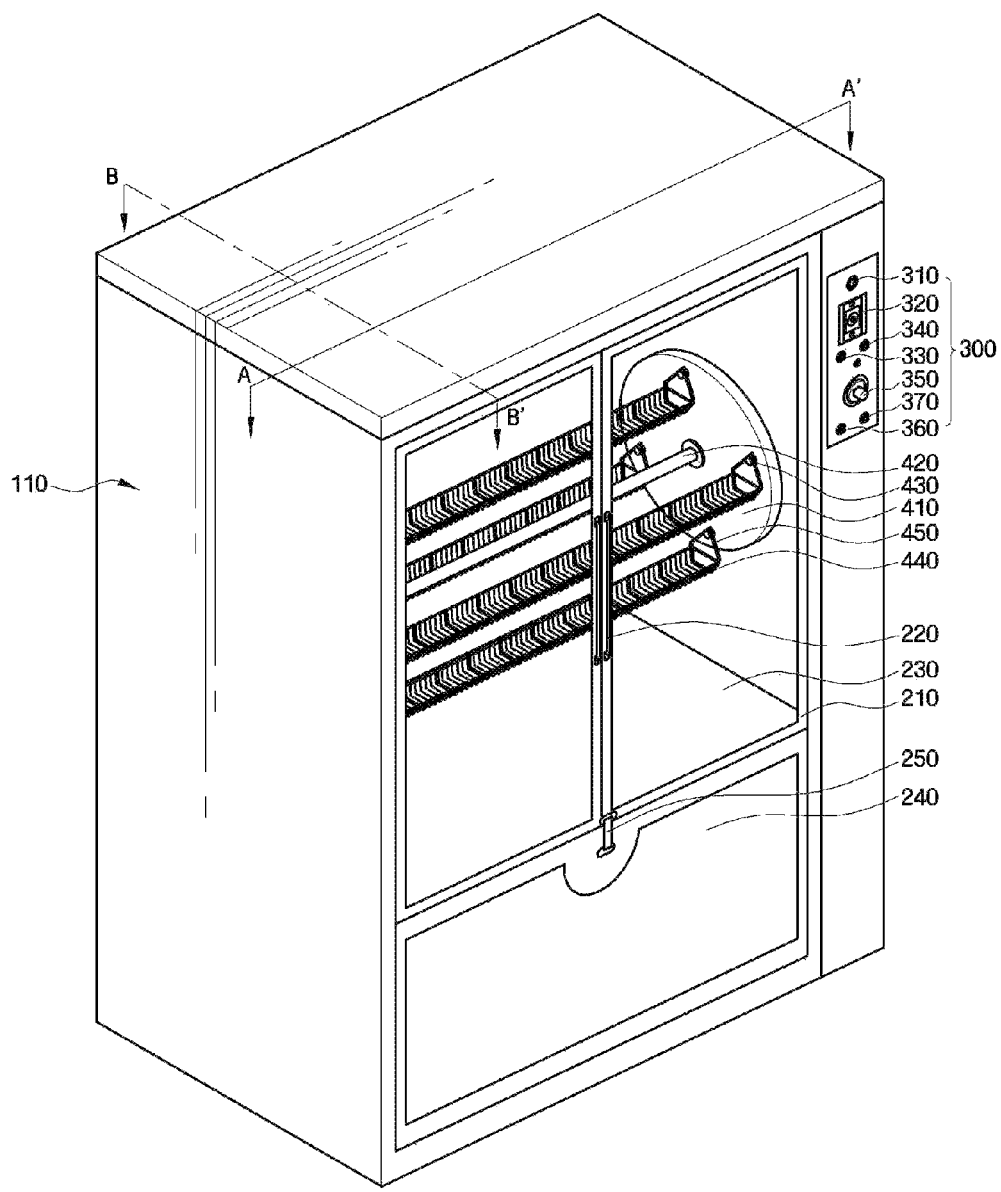
FIG. 1 is a perspective view for explaining an oven having loess layers according to first and second embodiments of this invention.

An oven having loess layers according to a first embodiment of the present invention will be described with reference to FIG. 1. FIG. 1 is a perspective view for explaining an oven having loess layers according to first and second embodiments of this invention.

As illustrated in FIG. 1, an oven having loess layers according to the first embodiment of the present invention includes: a main body portion 110, a door portion 210, and a container portion 240.

The main body portion 110 may be provided in a sealed vessel fashion such as a rectangular parallelepiped, regular hexahedron, globular shape, and ellipse globular shape. The main body portion 110 is only illustrative and is not limited to the shape thereof as long as it offers a cooking space (referred to as S1 of FIG. 2) in which foodstuffs can be cooked.

The main body portion 110 can be opened and closed by at least one door portion 210. The door portion 210 is illustrated into two doors in this embodiment, but the number and size of the door portion 210 can be decided considering a thermal efficiency of a cooking space and size of foodstuffs.

Thus, the number or size of the door portion of the present invention is not limited to the door portion 210 illustrated in FIG. 1.

Windows 230 can be supplied in the door portion 210 so that a cook can confirm a cooking state of the foodstuffs with the naked eye. Also, a grip portion 220 can be offered in the door portion 210, in order to make the door portion 210 easily opened and closed.

A container portion 240 can be provided at the lower portion of the cooking space S1 so that wastes such as oil and leftover that are separated from foodstuffs can be temporarily stored therein. A separate container vessel (not shown) that can contain wastes can be offered in a storage space S2 of the container portion 240. The storage space S2 can be linked with the cooking space S1 through penetrating holes (not shown). A locking portion 250 can be formed in the container portion 240 to open/close and fix the container portion 240.

A control device 300 that turns on/off the oven and controls a heating time, a heating temperature, etc., can be arranged in one side of the main body portion 110.

The control device 300 can include a switch 310 that turns on/off the oven, a timer 320 that controls a heating time automatically, a speed controller 330 that controls speed of revolution of a gridiron turning device, a timer switch 340 that turns on/off the timer 320, an automatic temperature controller 350 that controls a heating temperature, an automatic temperature controller switch 360 that turns on/off the automatic temperature controller 350, and an internal lighting switch 370 that turns on/off light sources (not shown) arranged in the cooking space S1.

Figure 2:
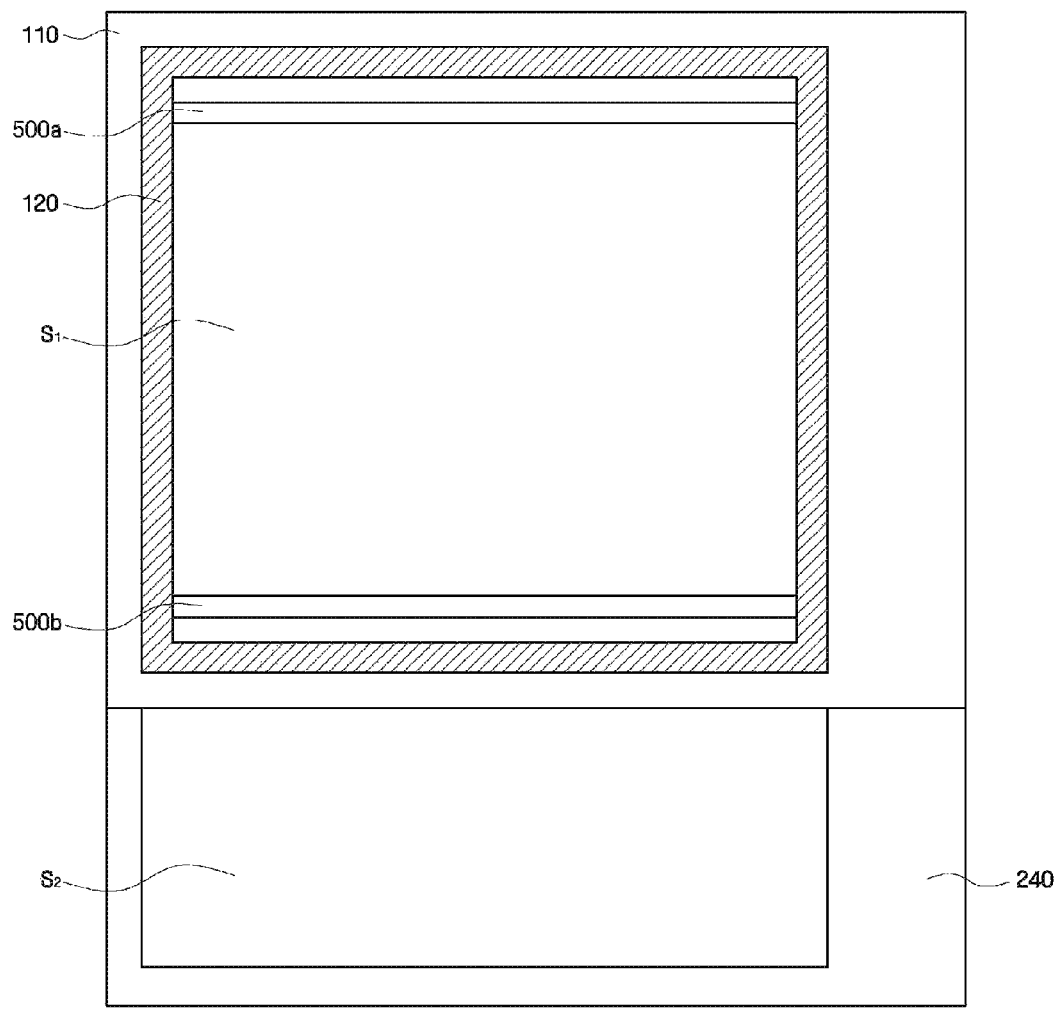
FIG. 2 is a cross-sectional view showing the oven having loess layers according to the first embodiment of this invention that is cut along a line A-A' of FIG. 1.
Figure 3:
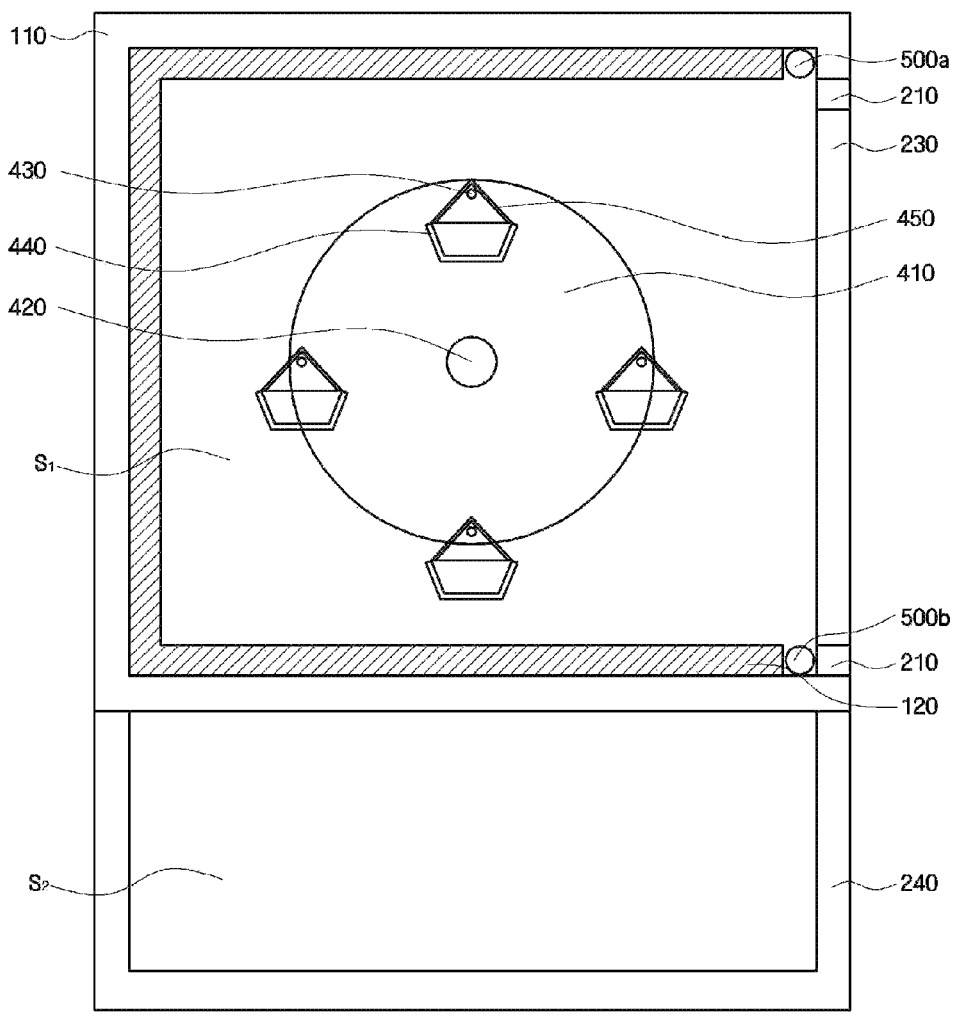
FIG. 3 is a cross-sectional view showing the oven having loess layers according to the first embodiment of this invention that is cut along a line B-B' of FIG. 1.

Referring to FIGS. 2 and 3, the cooking space S1, the heat generation rods and the storage space S2 of the present embodiment will be described below.

FIG. 2 is a cross-sectional view showing the oven having loess layers according to the first embodiment of this invention that is cut along a line A-A' of FIG. 1, and FIG. 3 is a cross-sectional view showing the oven having loess layers according to the first embodiment of this invention that is cut along a line B-B' of FIG. 1.

Referring to FIGS. 2 and 3, loess layers 120 are coated on inner walls of the main body portion 110. In the case that the main body portion 110 is formed into a rectangular parallelepiped for example, loess layers 120 can be coated on the whole inner walls of the main body portion 110 except for the door portion 210 having windows 230.

The loess layers 120 control humidity in the cooking space S1 so that foodstuffs can contain suitable water. Also, the loess layers 120 can reduce a fuel cost for a heating time due to an excellent heat insulation effect. Meanwhile, the loess layers 120 can play a role of removing offensive odor that is generated from the foodstuffs during cooking. Further, far infrared rays emitted from the loess layers 120 can be absorbed in the foodstuffs.

The loess layers 120 of this embodiment can include red clay and yellow mica. The red clay and yellow mica can be provided as powder of particle diameter of 1 mm or less. Accordingly, a heat radiation rate and a moisture content ratio of the loess layers 120 can be improved.

It is desirable that powder of the red clay is formed of original red clay that has not been weathered. The original red clay that has not been weathered has an excellent cohesion capability to thus play a role of deodorizing offensive odor from the foodstuffs. Powder of yellow mica has an excellent heat storage function, to thereby enhance a heat radiation function.

In the case that powder of red clay and yellow mica is heated, far infrared rays can be emitted into the cooking space.

The loess layers 120 of this embodiment can be formed including white cement to improve an adhesive strength with respect to the inner walls of the main body portion 110. In order to maximize a heat insulation effect, an adhesion effect, and a far infrared ray radiation effect, it is desirable that a loess layer 120 include red clay powder of 32.5-42.5 weight %, yellow mica powder of 32.5-42.5 weight % and white cement of 15-35 weight %. In this embodiment, a loess layer 120 including red clay powder of 37.5 weight %, yellow mica powder of 37.5 weight % and white cement of 25 weight % will be described as an example. The red clay powder and the yellow mica powder have a particle diameter of 1 mm or less, respectively.

The loess layer 120 located at the upper part of the container portion 240 can communicate with the cooking space so that wastes separated from the foodstuffs can fall down into the storage space of the container portion 240.

In this case, communication holes of the loess layer 120 can have size and position that correspond to the penetrating holes formed in the cooking space S1.

Referring to FIG. 3, heat generation rods 500a and 500b are disposed in at least one side of the cooking space S1. At least one of the heat generation rods 500a and 500b can be respectively arranged at the upper and lower parts of the main body portion 110.

External electric power source is connected to the heat generation rods 500a and 500b. In this case, the heat generation rods 500a and 500b function as resistors to thus play a role of transmitting heat to the cooking space S1.

It is desirable that the heat generation rods 500a and 500b are arranged at a plurality of positions in the cooking space S1 so that foodstuffs are not locally heated.

Figure 4:
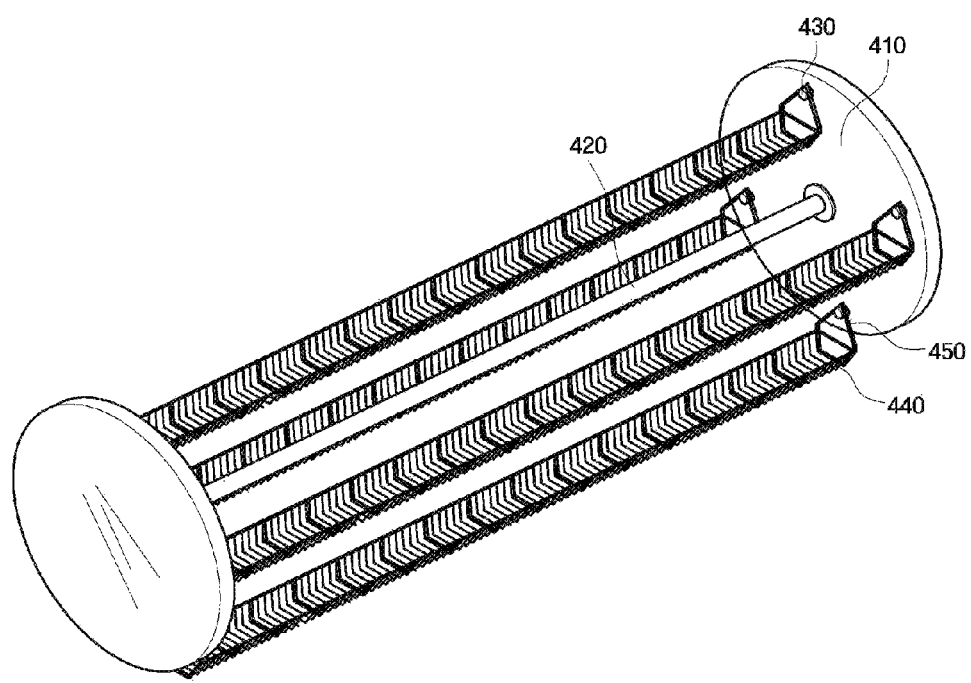
FIG. 4 is a perspective view showing a turning gridiron included in the respective ovens having loess layers according to the first and second embodiments of this invention.

Referring to FIGS. 1, 3 and 4, the oven including loess layers according to the embodiment of the present invention can further include a gridiron turning device.

A gridiron 440 is arranged in the cooking space S1. Foodstuffs are put in the gridiron 440 and cooked in the cooking space.

In the case that temperature distribution of the cooking space S1 is nonhomogeneous, foodstuffs such as chicken are locally heated. Accordingly, in order to prevent a particular region of chicken from burning and another particular region thereof from ripening less, a gridiron 440 can be provided for the gridiron turning device.

The gridiron turning device can include a rotating shaft 420 to make rotating plates 410 rotate. The rotating shaft 420 is connected with an external motor (not shown) to thus play a role of making the rotating plates 410 rotate. The rotating shaft 420 can be fixed to either end of the inner walls facing each other of the main body portion 110, and can be arranged to transverse the cooking space S1. The rotating plates 410 can be arranged on one and the other inner walls facing each other in the main body portion 110, respectively.

Gridiron fixing pins 430 are formed on the edges of the rotating plates 410. Gridirons 440 are rotatably fixed to the gridiron fixing pins 430 with gridiron supports 450, respectively. In the case that the gridiron supports 450 are rotatably fixed to the gridiron fixing pins 430 and the rotating plates 410 rotate, the gridiron fixing pins 430 rotate clockwise or anticlockwise. In this case, the gridirons 440 perform circular motions clockwise or anticlockwise, respectively. Foodstuffs that have been put in the gridirons 440 move in the cooking space S1 to then be heated. Therefore, the foodstuffs can be uniformly heated in the gridirons 440.

Meanwhile, the gridirons 440 can be connected with an external electric power source (not shown) to thus make them perform a heating function, respectively. That is, the gridirons 440 can perform a heating function, themselves, to thus maximize a heating effect.

According to the oven including loess layers of this embodiment, foodstuffs can contain suitable water for a cooking time by the loess layers, and remove offensive odor generated from the foodstuffs during the cooking time. Far infrared rays are irradiated to foodstuffs from the loess layers, to thereby enable a cook to provide food of excellent taste and nutrition. In addition, the loess layers have an excellent heat insulation effect to thus reduce a fuel cost to be incurred for a heating time. Further, foodstuffs are uniformly heated by a gridiron turning device. In particular, in the case that foodstuffs are fowls, they can be sufficiently heated to enable eaters as well as cooks to be perfectly free from a worry of infection of avian influenza (AI).

Referring to FIGS. 5 through 8, an oven including loess layers according to a second embodiment of this invention will be described below in detail.

Figure 5:
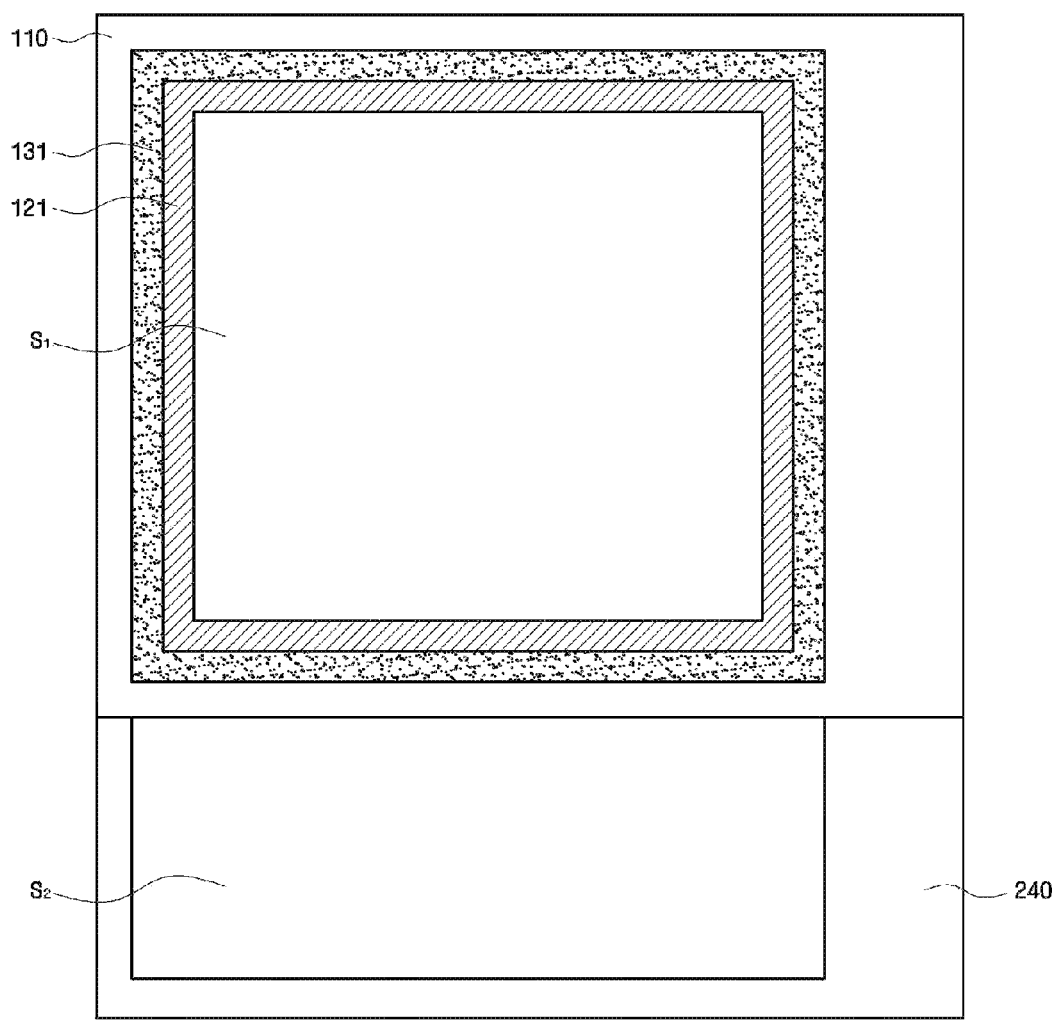
FIG. 5 is a cross-sectional view showing the oven having loess layers according to the second embodiment of this invention that is cut along a line A-A' of FIG. 1.
Figure 6:
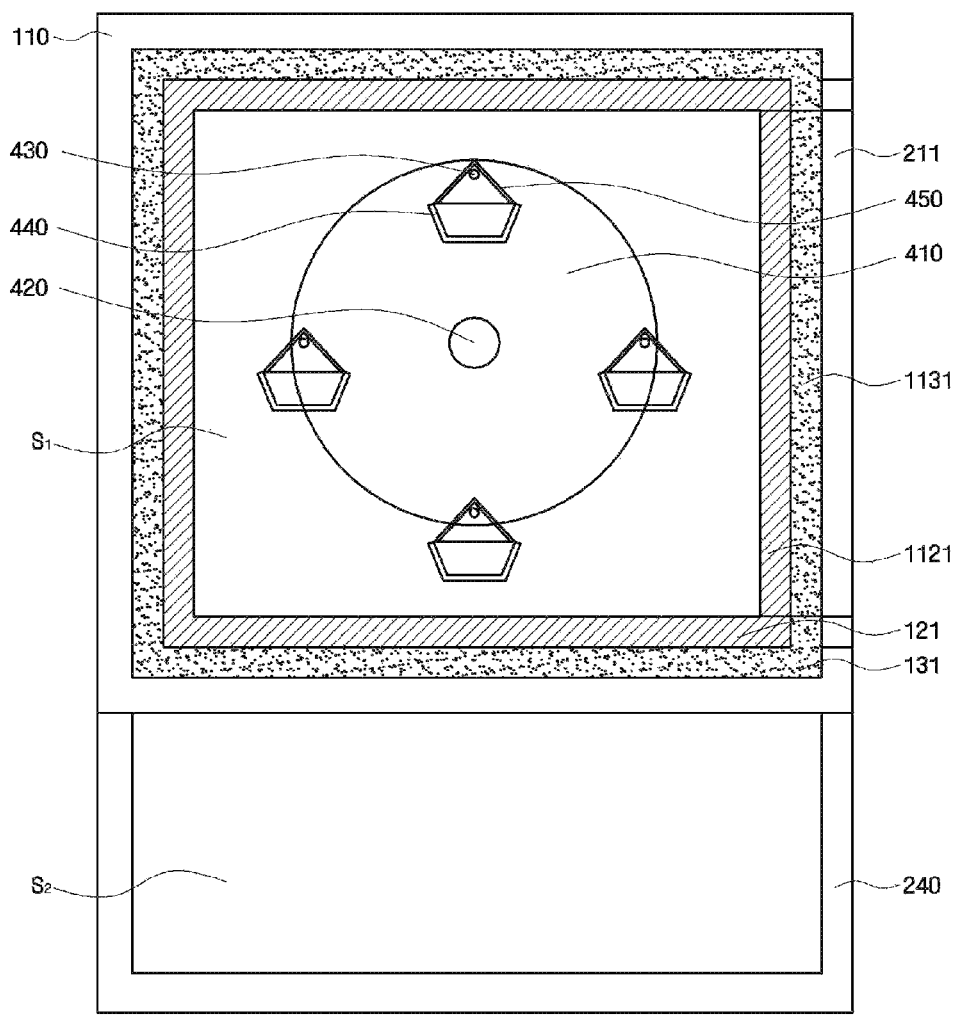
FIG. 6 is a cross-sectional view showing the oven having loess layers according to the second embodiment of this invention that is cut along a line B-B' of FIG. 1.
Figure 7:
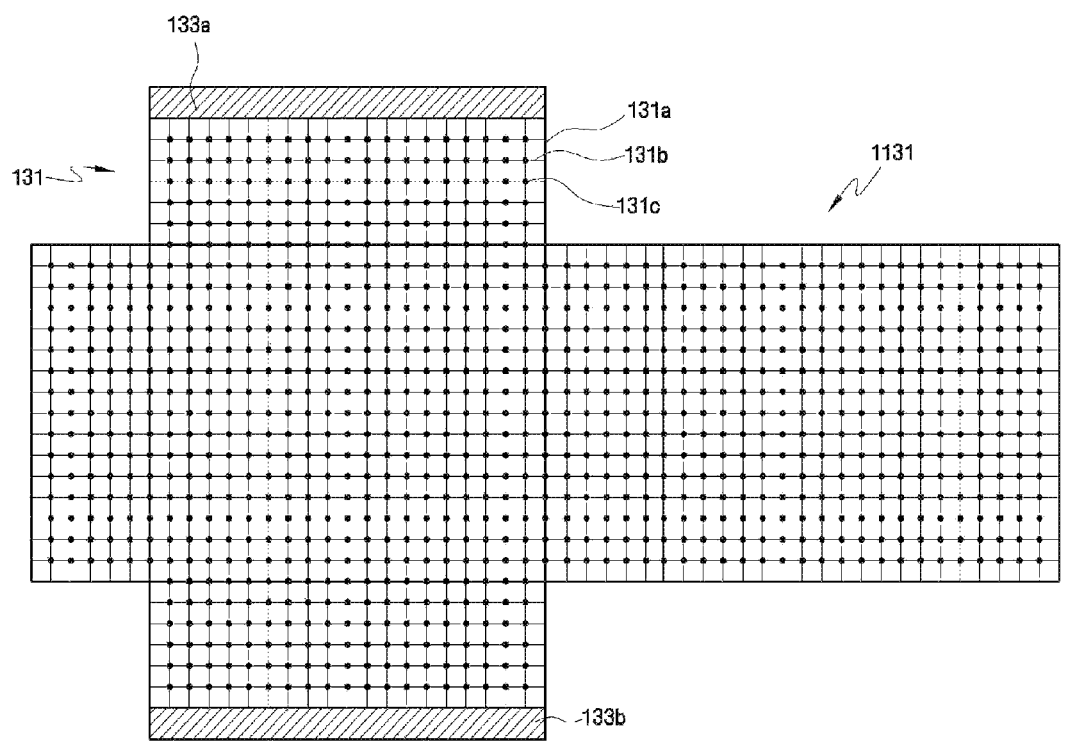
FIG. 7 is a development figure of a carbon fiber included in the oven having loess layers according to the second embodiment of this invention.
Figure 8:
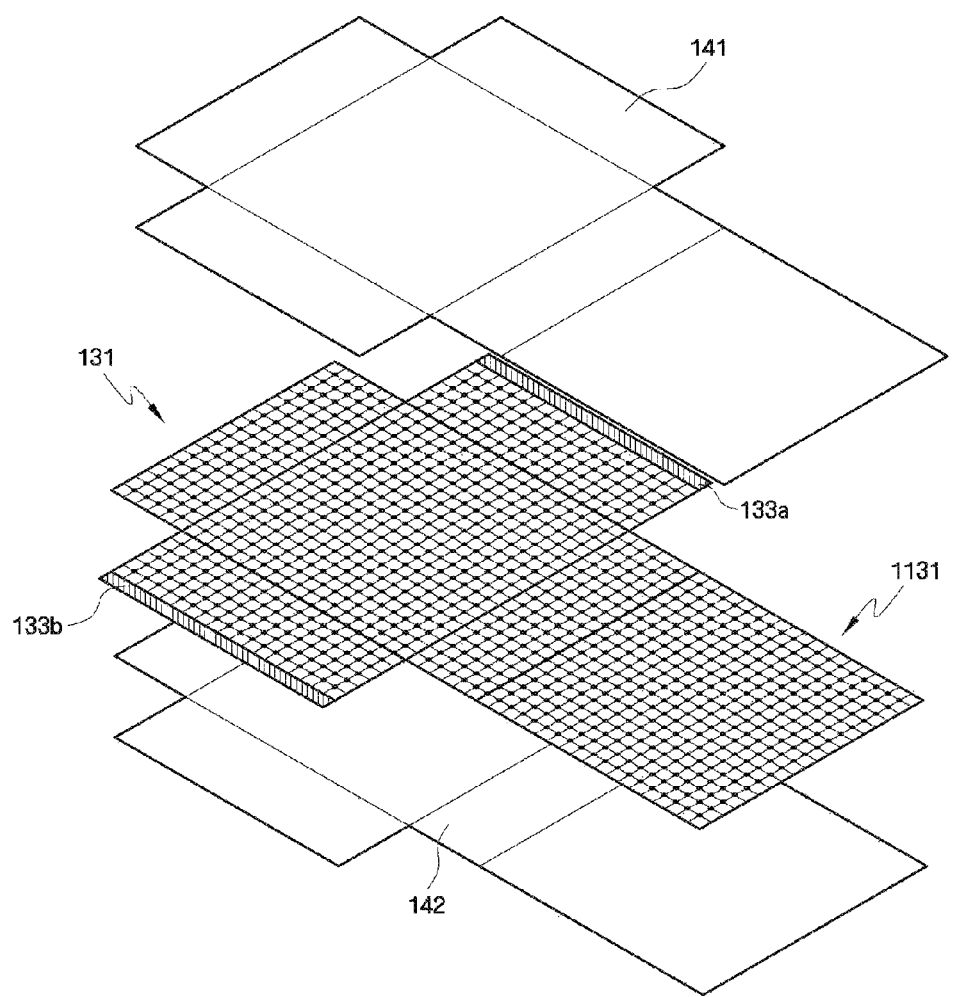
FIG. 8 is an exploded perspective view showing a heat generation layer included in the oven having loess layers according to the second embodiment of this invention.

FIG. 5 is a cross-sectional view showing the oven having loess layers according to the second embodiment of this invention that is cut along a line A-A' of FIG. 1. FIG. 6 is a cross-sectional view showing the oven having loess layers according to the second embodiment of this invention that is cut along a line B-B' of FIG. 1. FIG. 7 is a development figure of a carbon fiber included in the oven having loess layers according to the second embodiment of this invention. FIG. 8 is an exploded perspective view showing a heat generation layer included in the oven having loess layers according to the second embodiment of this invention.

Referring to FIGS. 5 and 6, heat generation layers 131 are formed on inner walls of the main body portion 110 of this embodiment. The heat generation layers 131 include a carbon fiber and include electrodes (not shown) to which an external electric power source is connected. The heat generation layers 131 are formed on the whole inner walls of the main body portion 110. The carbon fiber existing in the heat generation layers 131 is heated when the electrodes are turned on by the external electric power source. Accordingly, the heat generation layers 131 function as a surface heat generation body.

Meanwhile, windows are not formed in the door portion 211 of this embodiment. Accordingly, a cooking degree of foodstuffs is controlled by an external controller (not shown). In this embodiment, the cooking degree of foodstuffs need not be confirmed with the naked eye. Accordingly, a heat generation layer 1131 can be formed even on an inner wall of the door portion 211. That is, the heat generation layers 131 and 1131 can surround the whole cooking space S1. In this case, since the whole cooking space S1 can be uniformly heated, a heating effect can increase. If foodstuffs are arranged at the center of the cooking space S1, they can be uniformly heated.

Specific structures of the heat generation layers 131 and 1131 will be described below in detail.

Loess layers 121 and 1121 including red clay and yellow mica can be formed on the heat generation layers 131 and 1131, respectively. The loess layers 121 and 1121 of this embodiment can be formed of the same material as that of the loess layer 120 of the previous embodiment of the present invention. Here, it is noted that the loess layer 1121 of this embodiment can be formed even on the door portion 211. Therefore, the whole cooking space S1 is surrounded by the loess layers 121 and 1121, to thereby enhance a heat insulation effect and a far infrared ray radiation effect.

Referring to FIGS. 7 and 8, the heat generation layers according to the embodiment of the present invention will be described below in detail.

Referring to FIG. 7, a carbon fiber can be provided in a net fashion in which latitude lines 131a and longitude lines 131b cross each other in this embodiment of this invention. The latitude lines 131a and the longitude lines 131b are fixed by using synthetic resin such as silicon, polyurethane, and polybenzimidazole, to thus form crossing points 131c. Since the latitude lines 131a and the longitude lines 131b of the carbon fiber are fixed as described above, carbon fiber interspace intervals are kept changelessly, to thereby obtain a uniform heat generation effect.

Referring to the development figure of the heat generation layers 131 and 1131, electrodes 133a and 133b can be formed along one side of the development figure. Electric power is applied to the carbon fiber through the electrodes 133a and 133b, and the carbon fiber acts as a resistor, to thereby heat the cooking space S1 (see S1 of FIG. 6).

The electrodes 133a and 133b can be formed by using metal adhesive tape such as copper tape on which conductive adhesive is deposited, and a conductive paste such as silver electrode paste.

Referring to FIG. 8, moisture-proof members 141 and 142 can be formed on at least one surface of the heat generation layers 131 and 1131 The moisture-proof members 141 and 142 play a role of preventing moisture from flowing into the heat generation layers 131 and 1131 by the loess layers (see reference numerals 121 and 1121 of FIG. 6), and of heat insulating the main body portion (see a reference numeral 110 of FIG. 6) and the door portion (see a reference numeral 211 of FIG. 6) with respect to the heat generation layers 131 and 1131. It is desirable that the moisture-proof members 141 and 142 are laminated on both surfaces of the heat generation layers 131 and 1131. The moisture-proof members 141 and 142 can be formed using for example, polyurethane, epoxy, polyethylene, polyester, polystyrene, polypropylene, polyamide, polycarbonate, acryl, ABS, cellulose, fluorocarbon, rubber, polyvinyl chloride (PVC), polyvinyl fluoride, epoxy resin impregnation glass woven fabric, etc.

Referring to FIGS. 9 through 13B, an oven including loess layers according to a third embodiment of this invention will be described below in detail.

Figure 9:
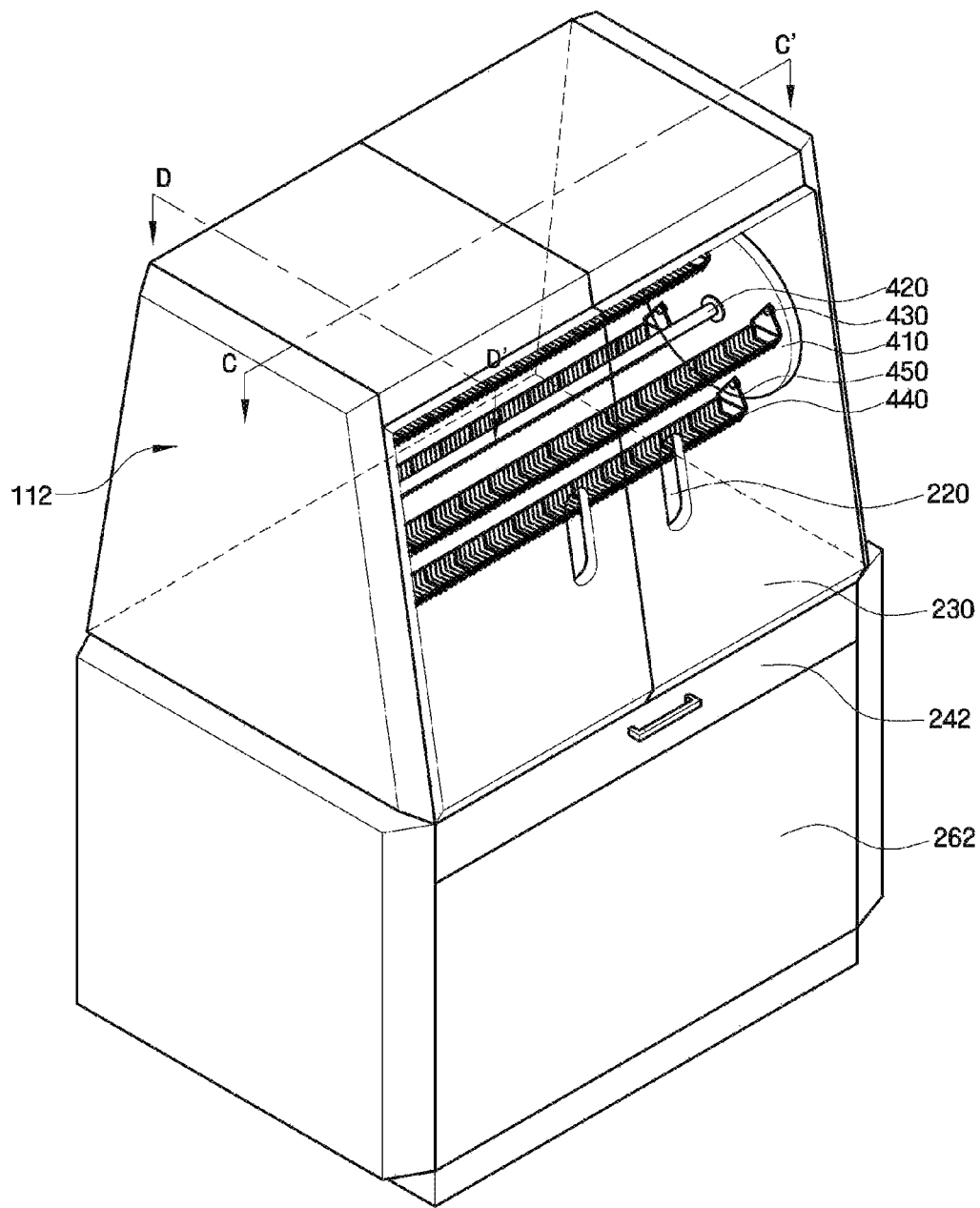
FIG. 9 is a perspective view showing an oven having loess layers according to a third embodiment of this invention.
Figure 10:
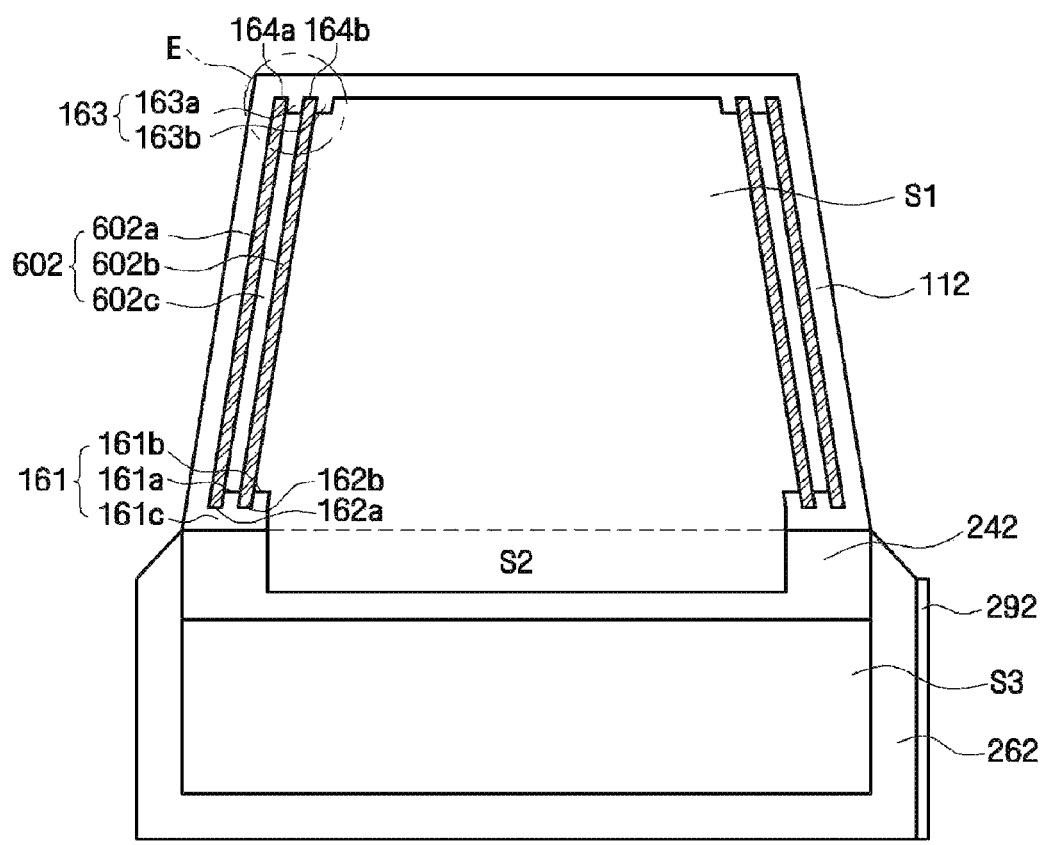
FIG. 10 is a cross-sectional view showing the oven having loess layers according to the third embodiment of this invention that is cut along a line C-C' of FIG. 9.
Figure 11:
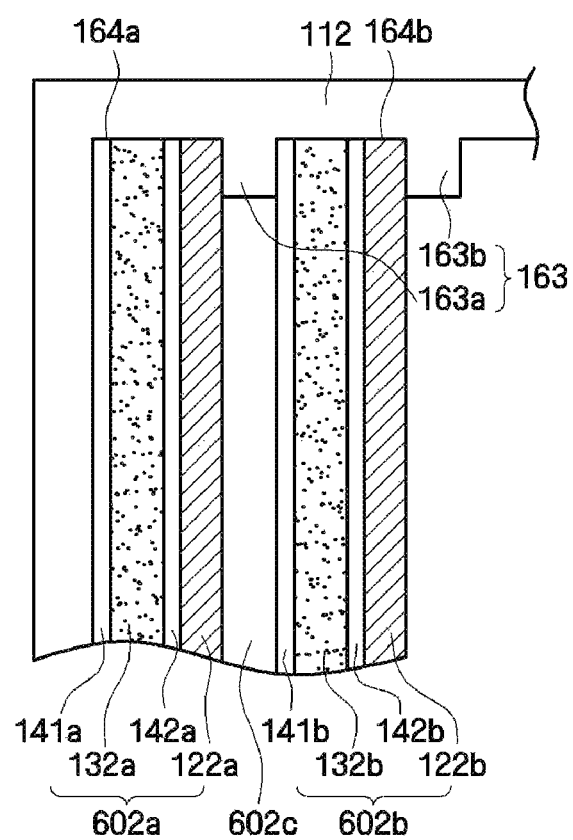
FIG. 11 is an enlarged view of a portion "E" of FIG. 10.
Figure 12:
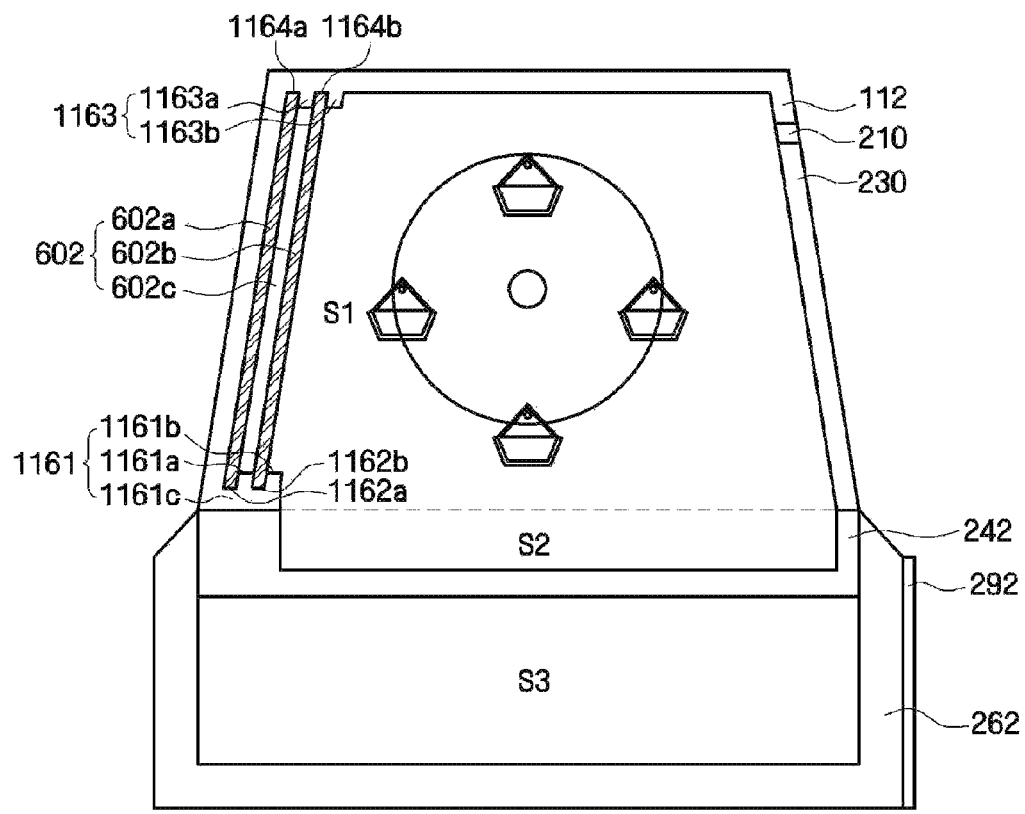
FIG. 12 is a cross-sectional view showing the oven having loess layers according to the third embodiment of this invention that is cut along a line D-D' of FIG. 9.
Figure 13A:
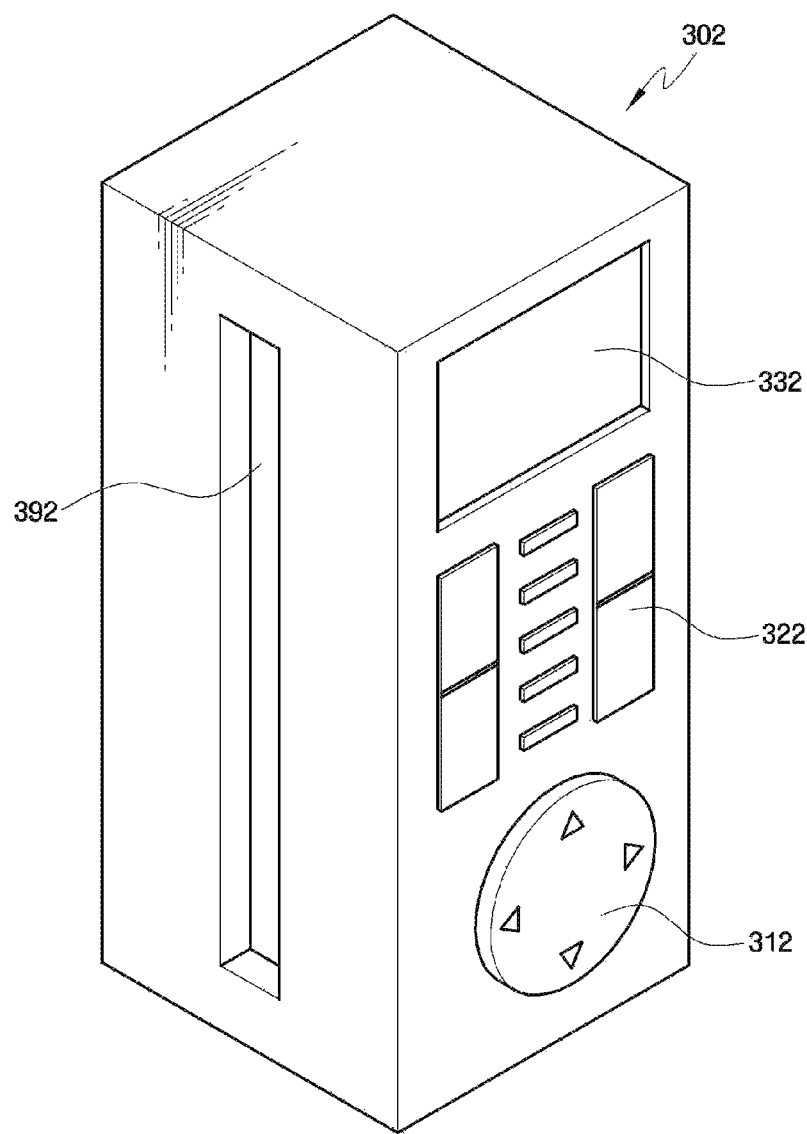
FIGS. 13A and 13B are perspective views respectively showing a control device included in the oven having loess layers according to the third embodiment of this invention.
Figure 13B:
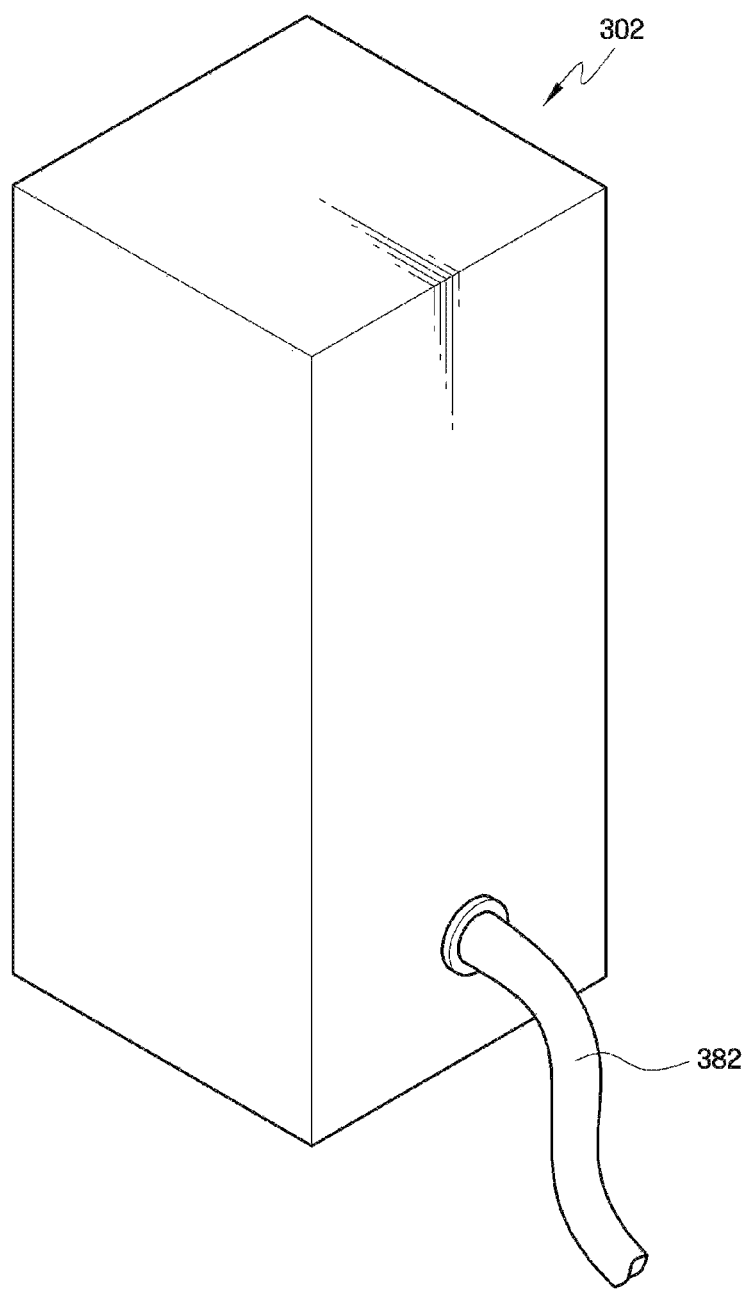

FIG. 9 is a perspective view showing an oven having loess layers according to a third embodiment of this invention. FIG. 10 is a cross-sectional view showing the oven having loess layers according to the third embodiment of this invention that is cut along a line C-C' of FIG. 9. FIG. 11 is an enlarged view of a portion "E" of FIG. 10. FIG. 12 is a cross-sectional view showing the oven having loess layers according to the third embodiment of this invention that is cut along a line D-D' of FIG. 9. FIGS. 13A and 13B are perspective views respectively showing a control device included in the oven having loess layers according to the third embodiment of this invention.

Referring to FIGS. 9 through 12, a cooking space 51 in a main body portion 112 of this embodiment can have a shape whose horizontal sectional area narrows as it goes from the lower part of the main body portion 112 to the upper part thereof, for example, a trapezoidal pillar shape. Accordingly, since windows 230 are arranged slantingly with respect to the ground, the foodstuffs can be easily confirmed.

The windows 230 of this embodiment can be made of for example, glass or reinforced acryl resin. The windows 230 of this embodiment are not supported by a door portion (not shown) but can be directly combined with a main body portion 112. In this occasion, the windows 230 can be linked with the main body portion 112 by hinges (not shown).

The lower portion of the main body portion 112 can be opened, and thus wastes such as oil and leftovers that are separated from foodstuffs can fall down into a container vessel 242. The container vessel 242 has a storage space S2 so that wastes such as oil and leftovers that are separated from foodstuffs can be contained therein. After cooking, the container vessel 242 that contains wastes is taken out from the main body portion 112, to then remove the wastes from the container vessel 242.

An air ventilation portion 262 can be arranged at the lower portion of the container vessel 242. The air ventilation portion 262 can include an air conditioning space S3. The air conditioning space S3 plays a role of discharging various poisonous gases that are produced from the foodstuffs and inhaling fresh air into the cooking space S1. For this purpose, a fan (not shown) can be arranged in the air conditioning space S3.

Supports 161, 163, 1161, and 1163 can be ranged at least one side of the main body portion 112. The supports 161, 163, 1161, and 1163 are formed on for example, side walls of the left and right sides or rear side of the main body portion 112 and/or the upper wall thereof, to thus support complex loess heat generation layers 602, respectively. Concretely, the supports 161, 163, 1161, and 1163 can include a first support 161 and a second support 163 for arranging a complex loess heat generation layer 602 on either side wall of the main body portion 112, and a third support 1161 and a fourth support 1163 for arranging a complex loess heat generation layer 602 on the rear side wall of the main body portion 112. The first support 161 and the third support 1161 are extended from the lower portion of both side walls of the main body portion 112, and the second support 163 and the fourth support 1163 are extended from the upper wall of the main body portion 112.

The side walls in the present invention are used to mean a wall that is arranged at the rear side of the main body portion 112, as well as walls that are arranged at the left and right sides of the main body portion 112. Here, the side wall that is arranged at the rear side of the main body portion 112 is called a rear wall.

Each support 161, 163, 1161, or 1163 includes a pair of first projecting portion 161a, 163a, 1161a or 1163a and second projecting portion 161b, 163b, 1161b, or 1163b, respectively. A first concave groove 162a, 164a, 1162a, or 1164a is formed between the side wall or rear wall of the main body portion 112 and the first projecting portion 161a, 163a, 1161a, or 1163a, respectively, and a second concave groove 162b, 164b, 1162b, or 1164b is formed between the first projecting portion 161a, 163a, 1161s, or 1163a and the second projecting portion 161b, 163b, 1161b, or 1163b, respectively.

The first support 161 and the third support 1161 can further include a floor support 161c and 1161c that are extended from the side wall of the main body portion 112 toward the cooking space S1.

The floor supports 161c and 1161c can be arranged to run parallel with the upper wall of the main body portion 112.

The first loess heat generation layer 602a is inserted into the first concave groove 162a, 164a, 1162a, or 1164a that is formed between the side wall of the main body portion 112 and the first projecting portion 161a, 163a, 1161a, or 1163a, respectively, and the second loess heat generation layer 602b is inserted into the second concave groove 162b, 164b, 1162b, or 1164b that is formed between the first projecting portion 161a, 163a, 1161a, or 1163a and the second projecting portion 161bs, 163b, 1161b, or 1163b, respectively.

The first loess heat generation layer 602a and the second loess heat generation layer 602b are spaced from each other by the first projecting portion 161a, 163a, 1161a, and 1163a. An air layer 602c is formed in the gap formed between the first loess heat generation layer 602a and the second loess heat generation layer 602b.

Concretely, the first loess heat generation layer 602a includes a first heat generation layer 132a, a first moisture-proof member 141a that is disposed on one surface of the first heat generation layer 132a, a second moisture-proof member 142a that is disposed on the other surface of the first heat generation layer 132a, and a first loess layer 122a that is disposed on the second moisture-proof member 142a. One surface of the first loess layer 122a contacts the second moisture-proof member 142a and the other surface of the first loess layer 122a contacts the air layer 602c.

The second loess heat generation layer 602b includes a second heat generation layer 132b, a third moisture-proof member 141b that is disposed on one surface of the second heat generation layer 132b, a fourth moisture-proof member 142b that is disposed on the other surface of the second heat generation layer 132b, and a second loess layer 122b that is disposed on the fourth moisture-proof member 142b. The third moisture-proof member 141b contacts the air layer 602c.

Since the air layer is interposed between the first loess heat generation layers 602a and the second loess heat generation layer 602b, the complex loess heat generation layers 602 have a heat insulation effect to thus minimize a heat energy loss when foodstuffs are cooked. Therefore, heat energy that is supplied for cooking foodstuffs can be reduced. Further, foodstuffs can be kept warmly in custody in the oven without providing additional heat energy for a considerable time after cooking, to thereby remarkably reduce energy. In addition, the far infrared rays emitted from the complex loess heat generation layers 602 are absorbed in the foodstuffs, to thus make the foodstuffs cooked into food whose taste and nutrition are excellent. In addition, foodstuffs can be completely cooked, to thus prevent cooks and eaters from being worried from infection of avian influenza (AI) or swine flu (A(H1N1)).

The first loess layer 122a and the second loess layer 122b can include red clay and yellow mica both of which particle diameters are 1 mm or less, respectively.

Referring to FIGS. 13A and 13B, the oven of this embodiment further includes a control device 302 that is electrically connected with the main body portion 112. The control device 302 of this embodiment can be arranged spaced from the main body portion 112 or is combined with the main body portion 112 via a function of a magnet.

The control device 302 can include a switch 312 that turns on/off and controls temperature in the oven, a controller 322 that controls a cooking time and a speed of revolution of a gridiron turning device, and an indicator 332 that indicates a cooking situation on a screen, for example, a liquid crystal display (LCD).

The control device 302 can be connected with the main body portion 112 by a cable 382 that is formed on the rear surface of the control device 302. A magnet groove 392 that is formed on one side of the control device 302 can be combined with a magnet protrusion 292 (of FIG. 10 or 12) formed in one side wall of either the main body portion 112 or the air ventilation portion 262.

The oven including loess layers according to this embodiment can heat foodstuffs evenly. In the case that the oven of this embodiment is used to cook fowls for example, a danger of infection of avian influenza can be perfectly prevented by a far infrared ray radiation cooking method. In addition, the oven of this embodiment enables a cook to perform initial roast of meat for a loess charcoal fire barbecue so as to have soft flesh. In addition to a heating process using the oven according to this embodiment, a charcoal fire heating process or a fragrance addition process can be performed additionally. As a result, the oven according to this embodiment can provide a loess charcoal fire barbecue that satisfies a wellbeing-pursuing consumers by providing barbecued meat whose taste and nutrition are excellent.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

What is claimed is:

1. An oven comprising:
a main body portion having a cooking space therein;
loess layers that are coated on inner walls of the main body portion and that comprise red clay and yellow mica, respectively; and
heat generation rods that are disposed on at least one side of the cooking space so as to heat the cooking space.

2. The oven according to claim 1, wherein each loess layer comprises red clay powder of 32.5-42.5 weight %, yellow mica powder of 32.5-42.5 weight % and white cement of 15-35 weight %.

3. The oven according to claim 1, further comprising a gridiron turning device that is rotatably arranged in the cooking space.

4. An oven comprising:
a main body portion having a cooking space therein;
a door portion through which foodstuffs are taken in or out from the cooking space;
heat generation layers with which inner walls of both the main body portion and the door portion are covered and that comprise a carbon fiber, respectively; and
loess layers that are coated on the heat generation layers and that comprise red clay and yellow mica, respectively.

5. The oven according to claim 4, wherein each loess layer is provided in a fabrics fashion that latitude lines and longitude lines of the carbon fiber cross and fix on each other.

6. The oven according to claim 5, wherein each heat generation layer further comprises a moisture-proof member that is disposed on at least one surface of the carbon fiber.

7. An oven comprising:
a main body portion having a cooking space therein;
a complex loess heat generation layer that comprises: a first loess heat generation layer; a second loess heat generation layer that is disposed spaced from the first loess heat generation layer; and an air layer that is interposed between the first loess heat generation layer and the second loess heat generation layer; and
supports that support the first loess heat generation layer and the second loess heat generation layer so that the first loess heat generation layer and the second loess heat generation layer are spaced from each other, wherein the first loess heat generation layer comprises a first heat generation layer and a first loess layer that is coated on the first heat generation layer, wherein the second loess heat generation layer comprises a second heat generation layer and a second loess layer that is coated on the second heat generation layer, and wherein the complex loess heat generation layer covers at least a part of the cooking space.

8. The oven according to claim 7, wherein each support comprises first and second projecting portions, and wherein the first loess heat generation layer is inserted into a first concave groove that is formed between a side wall of the main body portion and the first projecting portion, and the second loess heat generation layer is inserted into a second concave groove that is formed between the first projecting portion and the second projecting portion.

9. The oven according to claim 8, wherein the first heat generation layer and the second heat generation layer comprise a carbon fiber, respectively, and the first loess layer and the second loess layer comprise red clay and yellow mica, respectively.

10. The oven according to claim 9, further comprising:

a first moisture-proof member arranged on one side of the first heat generation layer;

a second moisture-proof member arranged on the other side of the first heat generation layer;

a third moisture-proof member arranged on one side of the second heat generation layer; and a fourth moisture-proof member arranged on the other side of the second heat generation layer.

11. The oven according to claim 10, wherein the first and second loess layers comprise a red clay powder and a yellow mica powder each particle diameter of which is 1 mm or less, respectively.

12. The oven according to claim 7, further comprising a control device that is electrically connected with the main body portion wherein the control device is magnetically combined with the main body portion through a function of a magnet.

* * * * *